United States Patent
Sakamoto

(10) Patent No.: US 7,464,998 B2
(45) Date of Patent: Dec. 16, 2008

(54) TELEVISION RECEIVER CABINET

(75) Inventor: Shinichiro Sakamoto, Osaka (JP)

(73) Assignee: Funai Electric Co., Ltd., Daito-Shi, Osaka (JP)

( * ) Notice: Subject to any disclaimer, the term of this patent is extended or adjusted under 35 U.S.C. 154(b) by 162 days.

(21) Appl. No.: 10/992,632

(22) Filed: Nov. 18, 2004

(65) Prior Publication Data

US 2005/0236939 A1   Oct. 27, 2005

(30) Foreign Application Priority Data

Nov. 18, 2003   (JP) .................... P.2003-387651

(51) Int. Cl.
   *A47B 5/00*   (2006.01)
(52) U.S. Cl. ........................ 312/7.2; 312/327
(58) Field of Classification Search ............ 312/7.2, 312/223.1, 223.2, 326, 327, 328, 329; 348/836, 348/843
   See application file for complete search history.

(56) References Cited

U.S. PATENT DOCUMENTS

| | | | | |
|---|---|---|---|---|
| D107,082 | S | * | 11/1937 | Mackelfresh ................ D9/613 |
| 5,009,080 | A | * | 4/1991 | Naganuma et al. ............ 62/256 |
| D338,588 | S | * | 8/1993 | Ancona et al. ............... D7/302 |
| 5,653,274 | A | * | 8/1997 | Johnson et al. ........... 144/208.8 |
| 5,682,300 | A | * | 10/1997 | Sung .......................... 361/817 |
| 5,844,635 | A | * | 12/1998 | Kim ........................... 348/826 |
| 5,913,580 | A | * | 6/1999 | Liu ............................. 312/108 |
| 5,969,776 | A | * | 10/1999 | Han ............................ 348/836 |
| 6,000,769 | A | * | 12/1999 | Chen ....................... 312/223.2 |
| 6,111,617 | A | * | 8/2000 | Cho ............................ 348/836 |
| 6,288,759 | B1 | * | 9/2001 | Cho et al. ................... 348/836 |
| 6,337,793 | B1 | * | 1/2002 | Vier et al. ................... 361/683 |
| 6,969,130 | B2 | * | 11/2005 | Newton et al. ........... 312/223.1 |
| 2002/0152949 | A1 | * | 10/2002 | Turner ........................ 116/284 |
| 2004/0105037 | A1 | * | 6/2004 | Ogawa et al. ............... 348/836 |

FOREIGN PATENT DOCUMENTS

| | | |
|---|---|---|
| JP | 57-69277 | 4/1982 |
| JP | 7-321480 | 12/1995 |
| JP | 3060952 | 6/1999 |

OTHER PUBLICATIONS

English Patent Abstract of 7-321480 from esp@cenet.

* cited by examiner

*Primary Examiner*—José V Chen
*Assistant Examiner*—Matthew W Ing
(74) *Attorney, Agent, or Firm*—Osha • Liang LLP

(57) ABSTRACT

A cover member capable of opening and closing a large opening formed at a bottom wall of a rear member having a cord lead out port is molded integrally with the bottom wall via a resin hinge. The electric cord is led to outside of the cabinet main body via the cord lead out port. The resin hinge is provided with a function of urging the cover member always in an opening direction. The cover member is provided with a projection comprising a rib. A projected piece of the cover member is provided with an attaching screw inserting hole. The cover member is fixed to a chassis by an attaching screw.

10 Claims, 4 Drawing Sheets

PRIOR ART

TELEVISION RECEIVER CABINET

BACKGROUND OF THE INVENTION

1. Field of the Invention

The present invention relates to a television receiver cabinet, particularly relates to a television receiver cabinet in which an electric cord is led to outside via a cord lead out port of a cabinet main body.

2. Description of the Related Art

According to a television receiver, an electric cord for a power source is led to outside via a cord lead out port of a cabinet. Further, according to a television receiver in which a cabinet is divided into a front cover (front cabinet) and a rear cover (rear cabinet), the front cover and the rear cover are fixed by interposing a bush of a cord at a portion of matching the two members (coupling portion) (refer to, for example, JP-A-7-321480 or Japanese Utility Model Registration No. 3060952). Further, a power source cord fixing apparatus holding a power source cord unmovably is interposed to fix at a portion of coupling a frame and a cover (refer to, for example, JP-UM-A-57-69277). Further, according to a constitution described in JP-UM-A-57-69277, the power source cord is led to outside from the portion of coupling the frame and the cover.

Meanwhile, according to a television receiver, for example, a DVD integrated type television receiver, there is a case in which an electric cord is fixed to a rear end portion of a chassis contained in a cabinet main body via a bush attached to the electric cord and the electric cord led from the fixed portion is led to outside via a cord lead out port provided to a rear wall of the cabinet main body. The constitution will be explained in reference to FIG. 7.

A television receiver cabinet in the drawing is provided with a cord lead out port 4 at a lower portion of a rear wall 21 of a cabinet main body 1, and an electric cord C fixed to a rear end portion of a chassis (not illustrated) contained in the cabinet main body 1 is led from the fixed portion and led rearwardly to outside via the cord lead out port 4. However, the cord lead out port 4 is formed in a size matching with a boldness of the electric cord C and therefore, there is a case in which it is difficult to pass a plug for a power source receptacle (not illustrated) provided at an end portion of the electric cord C through the cord lead out port 4.

Hence, according to the cabinet of FIG. 7, a bottom wall 22 of the cabinet main body 1 is opened with an opening 5 for operating to lead out the cord larger than the cord lead out port 4 and continuous to the cord lead out port 4 and the electric cord C is moved to the cord lead out port 4 by utilizing the opening 5. When constituted in this way, it is not necessary to pass the plug for the power source receptacle through the cord lead out port and a step of leading the electric cord C to outside of the cabinet main body 1 is made to be able to carry out without difficulty.

However, from a view point of safety or the like, it is not preferable to make the electric cord C led around at inside of the cabinet main body 1 face the opening 5 to expose to outside. Therefore, there has been devised means for integrally molding a cover member 6 for opening and closing the opening 5 along with the rear wall 22 of the cabinet main body 1 including a resin-molded member via a resin hinge 61, moving the electric cord C led to the outside as shown by an arrow mark a by utilizing the opening 5 and thereafter closing the opening 5 by closing the cover member 6 and screwing the cover member 6 closing the opening 5 to a rear end portion of a chassis contained in the cabinet main body 1 by way of operation rearward from the cabinet main body 1. Further, in order to enable to carry out the operation, the cover member 6 is provided with a handle piece 62 for lifting the cover member 6 by the finger F of the hand to move to close as well as a projected piece 63 having an attaching screw inserting hole 64 positioned to a screw hole (not illustrated) of the chassis.

However, there is known the following problem in the television receiver cabinet as a comparative example explained in reference to FIG. 7.

That is, when the cover member 6 is closed and the attaching screw inserting hole 64 is positioned to the screw hole of the chassis, not only there is needed operation of lifting the handle piece 62 of the cover member 6 by the finger F of the hand but also operation of screwing the cover member 6 to the chassis by way of the operation rearward from the cabinet main body 1 is obliged to carry out while lifting the handle piece 62 of the cover member 6 by the finger F of the hand. Therefore, there poses a problem that operation of closing the cover member 6 and screwing operation are troublesome.

Further, when the television receiver is installed by placing a seating portion (not illustrated) including a projected portion directed downwardly provided to the bottom wall of the cabinet main body 1 on a mounting face of a placing base or the like, there is formed a vacant portion on a lower side of the cover member 6 closing the opening portion 5 and therefore, when the electric cord C led from the cord lead out port 4 is pulled to a lower side, the electric cord C strongly impinges on a rear end (free end) of the cover member 6 to exert a large downward force to the cover member 6 and there is a concern of deforming or destructing the cover member 6 by such a force.

Further, when the cover member 6 is integrally molded to the bottom wall 22 of the cabinet main body 1 by a synthetic resin via the resin hinge 61, the resin material is not moved around a molding space of the cover member 6 to bring about a deficiency in filling and there also poses a problem that the cover member is easy to deform in molding owing to the deficiency in filling.

SUMMARY OF THE INVENTION

The invention has been carried out in view of the above-described problem and situation and it is an object thereof to provide a television receiver cabinet made to be able to easily carry out screwing operation rearward from a cabinet main body by carrying out operation of closing the cover member 6 without manual labor even in the case of a cabinet for enabling to carry out a step of leading an electric cord to outside of the cabinet main body 1 by forming an opening larger than a cord lead out port at the cabinet main body as in the television receiver cabinet explained in reference to FIG. 7 and thereafter closing the opening by a cover member.

Further, it is an object of the invention to provide a television receiver cabinet in which there is not a concern of deforming a cover member or destructing the cover member after deforming the cover member even when an electric cord led from a cord lead out port is pulled downwardly by supporting the cover member by a mounting face when a television receiver installed on a mounting face.

Further, it is an object of the invention to provide a television receiver cabinet in which in molding a cabinet main body, a resin material is made to be moved around easily in a molding space of a cover member and deformation in molding the cover member by a deficiency in filling is made to be difficult to be brought about.

Means for Solving the Problems

According to a television receiver cabinet of the invention, an electric cord fixed to a chassis and led out from a portion of fixing the electric cord to the chassis is led out to outside via a cord lead out port provided to a cabinet main body including a molded member of a synthetic resin. Further, the cord lead out port is provided at a lower portion of a rear wall of the cabinet main body, a bottom wall of the cabinet main body is formed with an opening for operating to lead out the cord continuous to the cord lead out port and larger than the cord lead out port, a cover member capable of opening and closing the opening is molded integrally with the bottom wall via a resin hinge having a function of urging the cover member in an opening direction, the cover member is provided with a projection for pushing up the cover member from an opened position to a closed position to move to close by riding over a mounting face when a seating portion including a projected portion directed downwardly provided to the bottom wall is mounted on the mounting face, and the cover member is provided with a projected piece having a screw inserting hole positioned to a screw hole of the chassis contained in the cabinet main body by disposing the cover member to the closed position.

According to the television receiver cabinet having such a constitution, the cover member is molded integrally with the bottom wall of the cabinet main body via the resin hinge having the function of urging the cover member in the opening direction and therefore, when the cabinet main body is mounted on a mounting face of an assembly line in a lying attitude, the opening for operating to lead out the cord is opened. Therefore, operation explained in reference to FIG. 7, that is, operation of easily leading out the electric cord by utilizing the opening for operating to lead out the cord and thereafter moving the electric cord to the cord lead out port can be carried out. Further, after the electric cord is moved to the cord lead out port, when the seating portion is mounted on the mounting face by constituting an attitude of installing the cabinet main body (attitude of installing the television receiver), the projection provided to the cover member rides over the mounting face to push up the cover member from the opened position to the closed position to move to close, thereby, the attaching screw inserting hole of the projected piece provided to the cover member is positioned to the screw hole of the chassis contained in the cabinet main body and therefore, it is not necessary to position the attaching screw inserting hole to the screw hole of the chassis by closing the cover member by the finger of the hand. Thereafter, the cover member is maintained at the closed position even when operation of screwing an attaching screw inserted through the attaching screw inserting hole to the screw hole of the chassis to fasten is carried out and therefore, there is not trouble of supporting the cover member by the finger of the hand when the operation is carried out. Further, when the television receiver is installed on the mounting face, the cover member is supported by the mounting face via the projection and therefore, even when a large force is exerted to the cover member by pulling the electric cord downwardly, there is not brought about a situation of deforming the cover member or destructing the cover member after deforming the cover member.

According to the invention, it is preferable that a lateral width of the opening for operating to lead out the cord is formed to be wider than a lateral width of the cord lead out port and when constituted in this way, operation of leading out the electric cord from inside to outside of the cabinet main body can easily be carried out.

Further, according to the invention, it is preferable that the lower portion of the rear wall, of the cabinet main body is formed with a projected piece containing port continuous in a horizontal direction of the cord lead out port and closed by the projected piece when the cover member is moved to close to dispose at the closed position and when the projected piece containing port is closed by the projected piece, the attaching screw inserting hole positioned to the screw hole of the chassis is opened rearwardly. According thereto, operation of screwing an attaching screw inserted through the screw inserting hole to the screw hole of the chassis to fasten can be carried out by way of operation rearward from the cabinet main body. Therefore, after the cabinet main body is disposed in an installed attitude, the fastening operation can immediately be carried without supporting the cover member by the hand.

According to the invention, a constitution that the projection includes a rib extended in a front and rear direction of the cover member can be adopted, and when the constitution is adopted, a wide range in the front and rear direction of the cover member is supported by the projection including the rib and therefore, the cover member can further firmly be prevented from being deformed or destructed when the electric cord is pulled downwardly. Further, in molding, a range of making a resin material flow is widened by a molding space of the projection including the rib to make a deficiency in filling difficult to be brought about and deformation of the molded cover member in molding can be prevented by the projection including the rib.

The television receiver cabinet according to the invention is further specified by adopting the following constitution. That is, the television receiver cabinet according to the invention is further specified by adopting a constitution that in a television receiver cabinet in which an electric cord fixed to a chassis and led out from a portion of fixing the electric cord to the chassis is led outside via a cord lead out port provided to a cabinet main body including a molded body of a synthetic resin, the cabinet main body is formed by coupling a front member and a rear member, the cord lead out port is provided at a lower portion of a rear wall of the rear member, a bottom wall of the rear member is opened with an opening for operating to lead out the cord continuous to the cord lead out port formed to be larger than the cord lead out port and wider than the cord lead out port in a lateral width thereof and a cover member capable of opening and closing the opening is molded integrally with the bottom wall via a resin hinge having a function of urging the cover member in an opening direction, the cover member is provided with a projection for pushing up the cover member from an opened position to a closed position to move to close by riding over a mounting face when a seating portion including a projected portion directed downwardly provided at the bottom wall is mounted on the mounting face, further, the projection includes a rib extended in a front and rear direction of the cover member, and the cover member is provided with a projected piece having an attaching screw inserting hole positioned to a screw hole of the chassis contained in the cabinet main body by disposing the cover member at the closed position, and the lower portion of the rear wall of the rear member is formed with a projected piece containing port continuous in a horizontal direction of the cord lead out port and closed by the projected piece when the cover member is moved to close to dispose at the closed position, and when the projected piece containing port is closed by the projected piece, the attaching screw inserting hole positioned to the screw hole of the chassis is opened rearwardly. Operation of the invention will be explained in details in reference to an embodiment, mentioned later.

According to the invention, even the cabinet in which after enabling to carry out the step of leading out the electric cord to outside of the cabinet main body 1 by forming the opening larger than the cord lead out port at the cabinet main body without difficulty, the opening is closed by the cover member, not only operation of closing the cover member is carried out without depending on manual labor but also the screwing operation rearward from the cabinet main body can easily be carried out without supporting the cover member by the hand and therefore, the operating step is reduced in comparison with that of the background art to promote the production efficiency. Further, when the television receiver is installed on the mounting face, the cover member is supported by the mounting face and therefore, even when the electric cord led out from the cord lead out port is pulled downwardly, there is not a concern of deforming the cover member or destructing the cover member after deforming the cover member. Further, in molding the cabinet, the resin material is made to be easy to move in the molding space of the cover member and deformation of the cover member in molding by a deficiency in filling is made to be difficult to be brought about.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
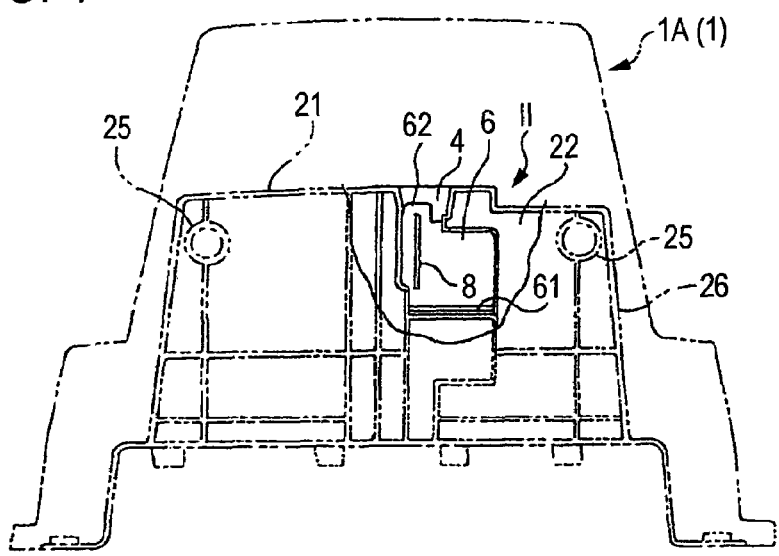
FIG. 1 is a bottom view showing an essential portion of a television receiver cabinet according to the invention viewed from a lower side.
Figure 2:
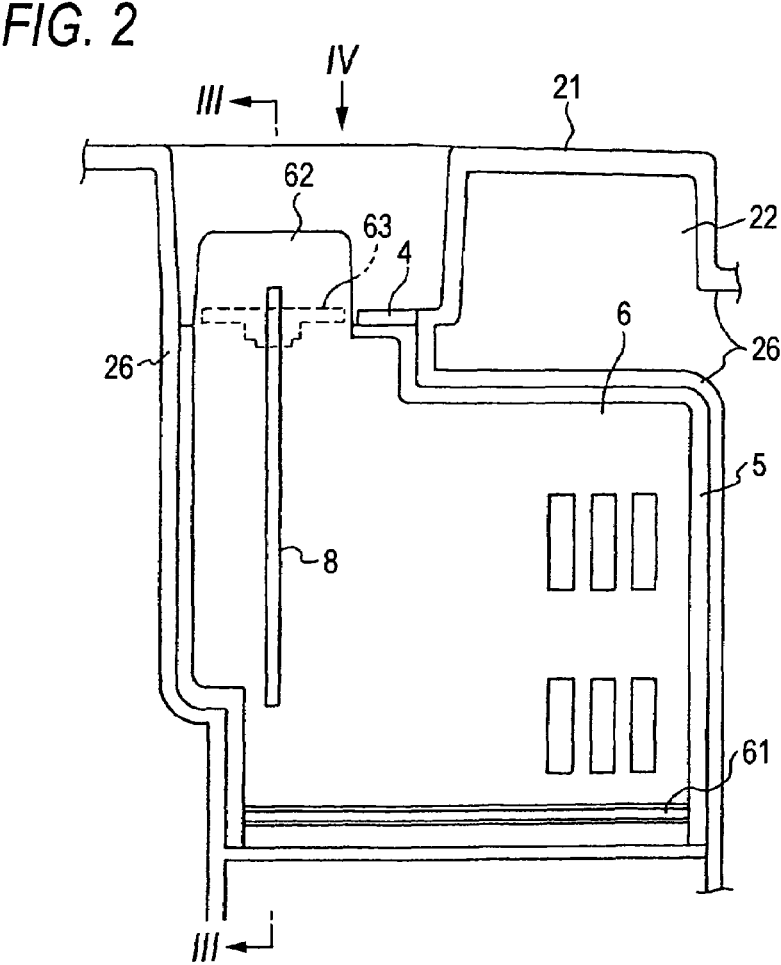
FIG. 2 is an enlarged view of a II portion of FIG. 1.
Figure 3:
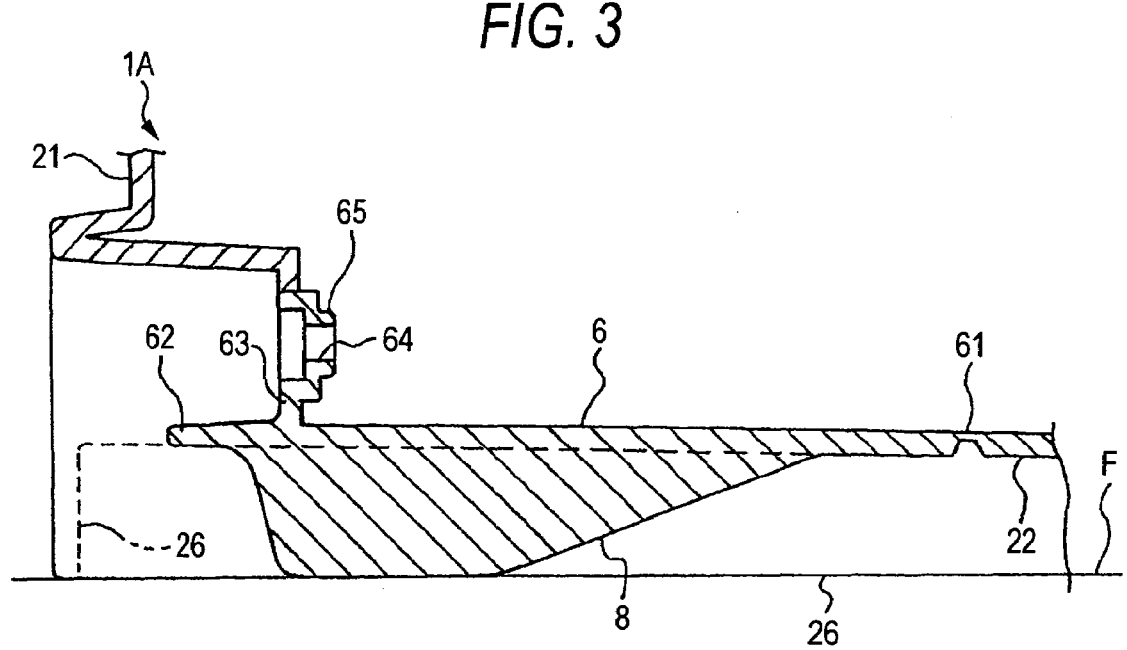
FIG. 3 is a sectional view of a portion taken along a line III-III of FIG. 2.
Figure 4:
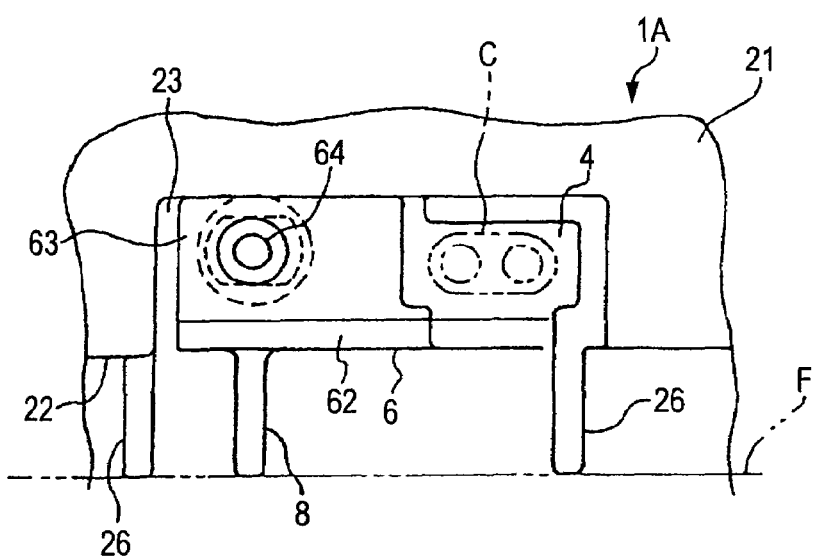
FIG. 4 is a view viewing FIG. 2 from a IV arrow mark direction.
Figure 5:
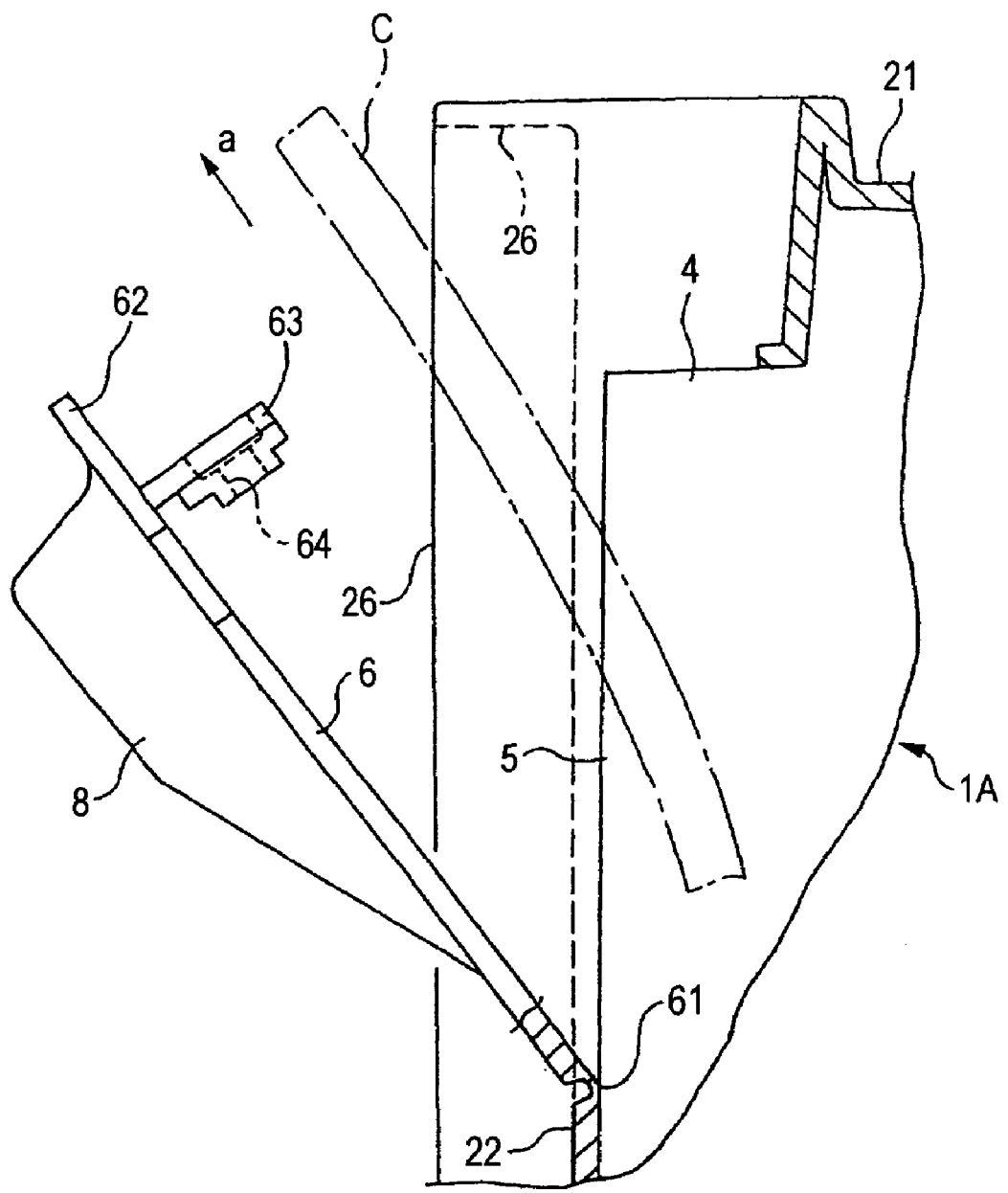
FIG. 5 is an explanatory view of a step of leading out an electric cord.
Figure 6:
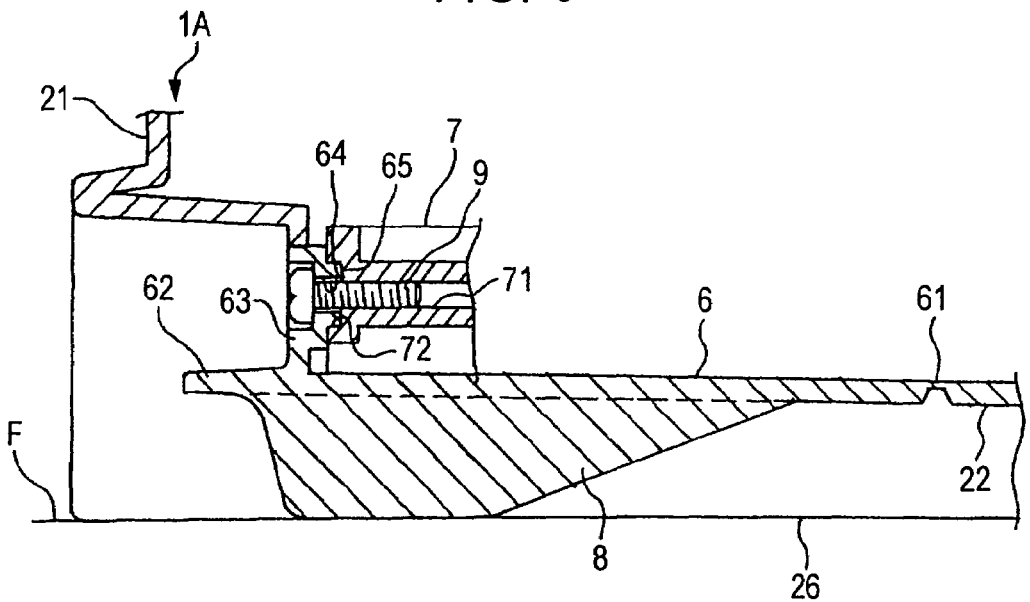
FIG. 6 is a vertical sectional view of an essential portion in a state of installing a television receiver.

FIG. 1 is a bottom view showing an essential portion of a television receiver cabinet according to the invention viewed from a lower side, FIG. 2 is an enlarged view of II portion of FIG. 1, FIG. 3 is a sectional view of a portion taken along a line III-III of FIG. 2, FIG. 4 is a view viewing FIG. 2 from a IV arrow mark direction, FIG. 5 is an explanatory view of a step of leading an electric cord, and FIG. 6 is a vertical sectional view of an essential portion in a state of installing the television receiver.

A cabinet main body 1 of a television receiver cabinet (hereinafter, refers to as 'cabinet') is divided into a front member, not illustrated, and rear member 1A shown in FIG. 1 and is formed by coupling the two members. Further, the front member is matched to the rear member 1A by sliding a chassis 7 (refer to FIG. 6) attached with the front member from a front side to contain to the rear member 1A, and after coupling the front member with the rear member 1A by screwing or the like at the matched portion, a step of leading an electric cord, mentioned later, or the like is carried out.

Therefore, the step of leading the electric cord is carried out in a state in which the chassis 7 is unmovably fixed to the rear member 1A.

Further, as shown by FIG. 4, a cord lead out port 4 is provided at a lower portion of a rear wall of the cabinet main body 1, further specifically, a lower portion of a rear wall 21 of the rear member 1A and an electric cord C is led to outside via the cord lead out port 4. Further, the electric cord C is fixed to a rear end of the chassis 7 via a bush (not illustrated) and is led out from the fixed portion via the cord lead out port 4.

As shown by FIG. 2 or FIG. 5, a bottom wall 22 of the rear member 1A is opened with an opening 5 for operating to lead the cord continuous to the cord lead out port 4. The opening 5 is formed to be larger than the cord lead out port 4 and wider than the cord lead out port 4 in a lateral width thereof. Further, a cover member 6 capable of opening and closing the opening 5 is integrally molded with the bottom wall 22 via a resin hinge 61 and the resin hinge 61 is provided with a function of urging the cover member 6 in an opening direction. That is, when an external force is not exerted to the cover member 6, the cover member 6 is made to be held at an opening position shown by FIG. 5 by the resin hinge 61.

Whereas the cover member 6 is provided with a projected piece 63 at a rear end portion thereof constituting a free end portion, a lower portion of the rear wall 21 of the rear member 1A (in correspondence with a rear wall of the cabinet main body 1) is formed with a projected piece containing port 23 continuous to the cord lead out port 4 in a horizontal direction (refer to FIG. 4). Further, when the opening 5 is closed by moving to close the cover member 6 to dispose at a closed position, as shown by FIG. 4, the projected piece 63 closes the projected piece containing port 23. Further, the projected piece 63 is provided with an attaching screw inserting hole 64 and when the cover member 6 is moved to close to dispose at the closed position, as shown by FIG. 6, the attaching screw inserting hole 64 faces a screw hole 71 provided at a rear end portion of the chassis 7 contained in the rear member 1A. According to the embodiment, whereas a surrounding of an opening of the screw hole 71 is formed as a fitting recessed portion 72, on a side of the projected piece 63, the attaching screw inserting hole 64 is provided at a boss portion 65 projected from the projected piece 63, and when the projected piece containing port 23 is closed by moving the cover member 6 to close to dispose at a closed position, the boss portion 65 is fitted to the fitting recessed portion 72 to position the attaching screw inserting hole 64 at the screw hole 71 and the attaching screw inserting hole 64 is opened rearwardly.

According to the embodiment, the cover member 6 is provided with a projection 8. Further, pertinent portions of the rear wall 22 of the rear member 1A (in correspondence with a bottom wall of the cabinet main body 1) are integrally molded with a seating portion 25 including a projected portion directed downwardly and a reinforcing rib 26 shown in FIG. 1 and the like, an outer width dimension of the projection 8 from the cover member 6 is constituted by a dimension the same as or a dimension substantially the same as an outer width dimension of the seating portion 25 from the bottom wall 22, and also an outer width dimension of the reinforcing rib 26 from the bottom wall 22 is constituted by a dimension the same as or a dimension substantially the same as the outer width dimension of the seating portion 25 from the bottom wall 22. Therefore, when the seating portion 25 is mounted on a flat mounting face F as shown by FIG. 3, FIG. 4 or FIG. 6, not only the reinforcing rib 26 is mounted on the mounting face F and the bottom wall 22 of the rear member 1A is supported by the mounting face F via the seating portion 25 and the reinforcing rib 26 but also the projection 8 is mounted on the mounting face F and the cover member 6 is supported by the mounting face F via the projection 8 at a closed position. Further, when from a state in which as shown by FIG. 5, the rear member 1A is mounted on the flat mounting face (not illustrated) in an attitude in which the rear member 1A lies down such that the seating portion 25 (which does not appear in the drawing) and the reinforcing rib 26 are directed horizontally, the attitude of the rear member 1A is changed on the mounting face and the seating portion 25 is mounted on the flat mounting face F, in the midst of changing the attitude, the projection 8 lies over the mounting face to push up the cover member 6 from an opened position to a closed position to move to close.

According to the embodiment, the projection 8 is formed by a rib extended in a front and rear direction of the cover member 6 and therefore, not only the projection 8 serves as a reinforcing rib for preventing flexing deformation or destruction accompanied by flexing deformation of the cover member 6 but also when the cover member 6 and the projection 8 are molded by a synthetic resin integrally with the rear member 1A, there is achieved an advantage that a range of making the resin material flow is enlarged by a molding space of the projection 8 including the rib to make a deficiency in filling difficult to be brought about.

According to the cabinet of the embodiment, by sliding the chassis 7 (refer to FIG. 6) attached with the front member to contain in the rear member 1A from the front side, the front member is matched to the rear member 1A and the front member is coupled with the rear member 1A by screwing or the like at the matched portion. After fixing the chassis 7 unmovably to the rear member 1A in this way, a step of leading the electric cord C is carried out.

Meanwhile, the bottom wall 22 of the cabinet main body 1 is opened with the opening 5 larger than the cord lead out port 4 and wider than the cord lead out port 4 in the lateral width, further, the resin hinge 61 supporting the cover member 6 is provided with the function of urging the cover member 6 in the opening direction and therefore, when the cabinet main body 1 formed by coupling the front member and the rear member 1A is mounted on the mounting face F of a production line in a lying down attitude, as shown by FIG. 5, the cover member 6 is opened to open the opening 5. Therefore, when a step of leading out the electric cord C fixed to the rear end of the chassis 7 via the bush is carried out, even when the end portion of the electric cord C is provided with a plug for a power source receptacle having a size which cannot be inserted into the cord lead out port 4, after leading the electric cord C to outside as shown by an arrow mark a by utilizing the opening 5, the electric cord C can be moved to the cord lead out port 4 and the step of leading out the electric cord of leading out the electric cord C to outside of the cabinet main body 1 can be carried out without difficulty.

After leading the electric cord C out of the cabinet main body 1 by utilizing the opening 5 to move to the cord lead out port 4, when the attitude of the cabinet main body 1 is changed above the mounting face F and the seating portion 25 is mounted on the flat mounting face F, in the midst of changing the attitude, the projection 8 rides over the mounting face F to push up the cover member 6 from the opened position to the closed position. The cover member 6 is moved to close only by changing the attitude of the cabinet main body 1 above the mounting face F, without operating to close the cover member 6 by the finger of the hand. Therefore, by only operating to change the attitude of the cabinet main body 1 necessary for shifting to a screwing step, mentioned later, as shown by FIG. 3 or FIG. 4, the opening 5 is closed by the cover member 6, the electric cord C led around at inside of the rear member 1A is not exposed, and safety is ensured. In accordance therewith, the projected piece 63 is contained in the projected piece containing port 23 of the rear member 1A to close the projected piece containing port 23, and the attaching screw inserting hole 64 is positioned relative to the screw hole 71 at the rear end of the chassis 7 (refer to FIG. 6). Therefore, after an operator mounts the seating portion 25 on the flat mounting face F by changing the attitude of the cabinet main body 1, the operator can immediately start the screwing step. As is known from FIG. 6, the screwing step is a step of screwing an attaching screw 9 inserted through the attaching screw inserting hole 64 by operation that is carried out rearward from the cabinet main body 1, that is, rearward from the rear member 1A to the screw hole 71 of the chassis 7.

After having been processed by the screen step, the cover member 6 is coupled to the rear member 1A at the closed position. Further, when a user installs the television receiver on the mounting face F of a television base (not illustrated) or the like, the cover member 6 is supported by the mounting face F via the projection 8 and therefore, even when a large force is applied to the cover member 6 by pulling the electric cord C led out from the cord lead out port 4, there is not brought about a situation in which the cover member 6 is flexed to deform or destructed after having been flexed to deform by the force.

Figure 7:
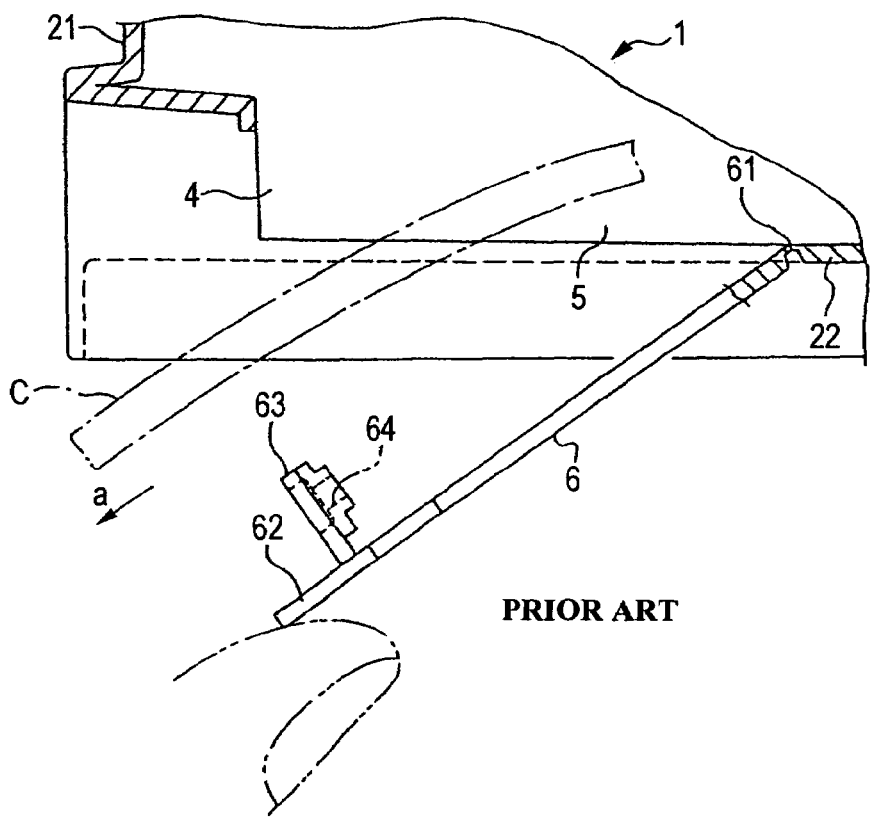
FIG. 7 is a vertical sectional view of an essential portion of a television receiver cabinet of a background art.

Further, according to the embodiment, the cover member 6 is provided with a handle piece 62 similar to that explained in reference to FIG. 7. Therefore, when the cover member 6 is opened by some reason, after removing the attaching screw 9, operation of pushing down the handle piece 62 by the finger of the hand by lifting the rear end side of the cabinet main body 1 can be carried out and the cover member 6 can easily be opened by carrying out such an operation.

What is claimed is:

1. A television receiver cabinet comprising: a cabinet main body formed by coupling a front member and a rear member; a cord lead out port located in a lower portion of a rear wall of the rear member; a cord fixed to the main body; an opening adjacent the rear wall, said opening configured to lead the cord out of the cord lead out port, wherein the opening is formed to be larger than the cord lead out port and wider than the cord lead out port in a lateral width thereof; a cover member that opens and closes the opening, molded integrally with a bottom wall of the rear member via a resin hinge, wherein the resin hinge urges the cover member in an opening direction away from the main body; a seating portion located on the bottom wall and supporting the main body on a mounting face or surface; a projection, located on the cover member and including a rib extended in a front and rear direction of the cover member; wherein, when the seating portion is slidably mounted on the mounting face or surface, the projection on the cover member is pushed up by contacting the mounting face or surface, the projection thereby pushing the cover member from an opened position to a closed position; and a projected piece on the cover member having: a screw inserting hole positioned to face a screw hole of a chassis contained in the cabinet main body when the cover member is disposed at the closed position, said chassis having a recessed portion surrounding the screw hole; and a boss portion surrounding the screw inserting hole, said boss portion being inserted into the recessed portion such that a screw is inserted into the screw hole through the screw inserting hole when the projection pushes up the cover member from the opened position to the closed position.

2. An electronic device cabinet comprising: a cabinet main body formed by coupling a front member and a rear member; a cord lead out port located in a lower portion of a rear wall of the rear member; a cord fixed to the main body; an opening configured to lead a cord out of the cord lead out port, wherein the opening is larger than the cord lead out port; a cover member that opens and closes the opening, molded integrally with a bottom wall of the rear member via a resin hinge, wherein the resin hinge urges the cover member in an opening direction away from the main body; a seating portion located on the bottom wall and supporting the main body on a mounting face or surface; a projection located on the cover member; wherein, when the seating portion is slidably mounted on the mounting face or surface, the projection on the cover member is pushed up by contacting the mounting face or surface, the projection thereby pushing the cover member from an opened position to a closed position; and a projected piece on the cover member having: a screw inserting hole positioned to face a screw hole of a chassis contained in the cabinet main body when the cover member is disposed at the closed position, said chassis having a recessed portion surrounding the screw hole; and a boss portion surrounding the screw inserting hole, said boss portion being inserted into the recessed portion such that a screw is inserted into the screw hole through the screw inserting hole when the projection pushes up the cover member from the opened position to the closed position.

3. The electronic device cabinet according to claim 2, wherein a lateral width of the opening for operating to lead out the cord is formed to be larger than the lateral width of the cord lead out port.

4. The electronic device cabinet according to claim 2, wherein the projection comprises a rib extended in a front and rear direction of the cover member.

5. The electronic device cabinet according to claim 2, further comprising a containing port disposed in a horizontal direction of the cord lead out port.

6. The electronic device cabinet according to claim 5, wherein the lower portion of the rear wall forms the containing port,
   wherein the containing port is closed by the projected piece when the cover is moved to the closed position, and
   wherein when the containing port is closed by the projected piece, the screw inserting hole is opened rearwardly.

7. The television receiver cabinet according to claim 2, wherein an outer width dimension of the rib from the bottom wall is substantially the same as an outer width dimension of the seating portion from the bottom wall.

8. A television receiver cabinet comprising: a cabinet main body formed by coupling a front member and a rear member; a cord lead out port located in a lower portion of a rear wall of the rear member; a cord fixed to the main body; an opening adjacent the rear wall, said opening configured to lead the cord out of the cord lead out port, wherein the opening is formed to be larger than the cord lead out port and wider than the cord lead out port in a lateral width thereof; a cover member that opens and closes the opening, molded integrally with a bottom wall of the rear member via a resin hinge, wherein the resin hinge urges the cover member in an opening direction away from the main body; a seating portion located on the bottom wall and supporting the main body on a mounting face or surface; a projection, located on the cover member and including a rib extended in a front and rear direction of the cover member; wherein, when the seating portion is slidably mounted on the mounting face or surface, the projection on the cover member is pushed up by contacting the mounting face or surface, the projection thereby pushing the cover member from an opened position to a closed position; and a projected piece containing port provided in the rear member; and a projected piece located on the cover member and contained in the projected piece contain port; said projected piece having: a screw inserting hole positioned to face a screw hole of a chassis contained in the cabinet main body when the cover member is disposed at the closed position, said chassis having a recessed portion surrounding the screw hole; and a boss portion surrounding the screw inserting hole.

9. A cabinet for an electronic device which is configured to be placed on a flat surface, comprising: a cabinet body, formed by a front member and a rear member, said rear member formed with a hole which is so configured that a cord is led out therethrough; a cover, provided on a bottom wall of the rear member and movable between a first position closing the hole and a second position opening the hole; a projection, located on the cover and designed to come in contact with the flat surface when the bottom wall is slidably mounted on the flat surface and when the cover is being moved from the second position to the first position, thereby closing the hole; a first engagement member, provided on the cabinet body; a second engagement member, provided on the cover and configured to engage with the first engagement member when the cover is placed in the first position; and a fixing member, configured to fix the second engagement member to the first engagement member under a condition that the second engagement member is engaged with the first engagement member.

10. The cabinet according to claim 9, further comprising:
   legs, provided on the bottom wall of the cabinet body, wherein:
   tip ends of the legs are configured to come in contact with the flat surface when the electronic device is placed on the flat surface; and
   a tip end of the projection is flush with the tip ends of the legs when the cover is placed in the first position.

* * * * *